US012260516B2

(12) United States Patent
Hudon et al.

(10) Patent No.: US 12,260,516 B2
(45) Date of Patent: Mar. 25, 2025

(54) IMAGE PROCESSING METHOD AND SYSTEM FOR CORRECTING COLORS OF AN INPUT IMAGE REPRESENTING A SCENE ILLUMINATED BY MULTIPLE ILLUMINANTS

(71) Applicant: 7 SENSING SOFTWARE, Paris (FR)

(72) Inventors: Matis Hudon, Charenton le Pont (FR); Elnaz Soleimani, Paris (FR)

(73) Assignee: 7 SENSING SOFTWARE, Paris (FR)

( * ) Notice: Subject to any disclaimer, the term of this patent is extended or adjusted under 35 U.S.C. 154(b) by 746 days.

(21) Appl. No.: 17/506,094

(22) Filed: Oct. 20, 2021

(65) Prior Publication Data
US 2023/0123646 A1    Apr. 20, 2023

(51) Int. Cl.
G06K 9/00 (2022.01)
G06F 18/214 (2023.01)
G06T 5/00 (2006.01)
G06V 10/56 (2022.01)
G06V 10/60 (2022.01)

(52) U.S. Cl.
CPC .............. *G06T 5/00* (2013.01); *G06F 18/214* (2023.01); *G06V 10/56* (2022.01); *G06V 10/60* (2022.01); *G06T 2207/10024* (2013.01); *G06T 2207/20081* (2013.01); *G06T 2207/20084* (2013.01)

(58) Field of Classification Search
CPC .............. G06T 5/00; G06T 2207/10024; G06T 2207/20081; G06T 2207/20084; G06V 10/56; G06V 10/60; G06F 18/214
USPC ........................................................ 382/156
See application file for complete search history.

(56) References Cited

U.S. PATENT DOCUMENTS

2020/0396434 A1    12/2020    Romanenko et al.

FOREIGN PATENT DOCUMENTS

EP    4 057 609 A1    9/2022

OTHER PUBLICATIONS

Hui, Zhuo, et al. "Learning to separate multiple illuminants in a single image." Proceedings of the IEEE/CVF Conference on Computer Vision and Pattern Recognition. 2019. (Year: 2019).*
Bianco, Simone, Claudio Cusano, and Raimondo Schettini. "Single and multiple illuminant estimation using convolutional neural networks." IEEE Transactions on Image Processing 26.9 (2017): 4347-4362. (Year: 2017).*

(Continued)

*Primary Examiner* — Jonathan S Lee
(74) *Attorney, Agent, or Firm* — NIXON & VANDERHYE (57) ABSTRACT

The present disclosure relates to an image processing method for correcting colors in an input image representing a scene, the image processing method including: processing the input image with a machine learning model, wherein the machine learning model is previously trained to detect a predefined number N>1 of sources of light illuminating the scene and to generate N estimated illuminant images associated respectively to the N sources of light, wherein each estimated illuminant image includes an estimated color of the light emitted by the respective source of light and an estimated contribution image; generating a total illuminant image by using the N estimated illuminant images; and generating an output image by correcting the colors in the input image based on the total illuminant image.

19 Claims, 3 Drawing Sheets

(56) References Cited

OTHER PUBLICATIONS

Hu et al., "FC$^4$: Fully Convolutional Color Constancy with Confidence-Weighted Pooling", 2017 IEEE Conference on Computer Vision and Pattern Recognition (CVPR), 2017, pp. 4085-4094.
International Search Report for PCT/EP2022/078256 dated Feb. 7, 2023, 3 pages.
Kim et al., "Large Scale Multi-Illuminant (LSMI) Dataset for Developing White Balance Algorithm under Mixed Illumination," 2021 IEEE/CVF International Conference on Computer Vision (ICCV), 2021, pp. 2390-2399.
Bianco et al., "Single and Multiple Illuminant Estimation Using Convolutional Neural Networks," IEEE Transactions on Image Processing, vol. 26, No. 9, Sep. 2017, pp. 4347-4362.

\* cited by examiner

IMAGE PROCESSING METHOD AND SYSTEM FOR CORRECTING COLORS OF AN INPUT IMAGE REPRESENTING A SCENE ILLUMINATED BY MULTIPLE ILLUMINANTS

TECHNICAL FIELD

The present disclosure relates to image processing and relates more specifically to a method and computing system for correcting colors of an input image representing a scene illuminated by multiple sources of light.

BACKGROUND ART

In image processing, color correction is the global adjustment of the intensities of the colors represented by the pixels of an image. An important goal of this adjustment is to render specific colors, particularly neutral colors, correctly. Such a color correction is usually referred to as white balance.

Scene illumination affects the overall color of an imaged scene. Hence, the illumination is usually estimated, in particular the color of the illumination cast on the scene, and the estimated illumination is subsequently corrected in the image (i.e. white balance). Such a color correction scheme which relies on estimating the illumination of a scene represented by an image and on subsequently correcting the image based on the estimated illumination is sometimes referred to as computational color constancy.

In the prior art, machine learning models have been proposed for estimating the illumination in an imaged scene. For instance, [Hu+2017] proposes to use a fully convolutional neural network, FCNN, to estimate the illumination of a scene. In the solution proposed in [Hu+2017], the previously trained FCNN provides local predictions of the illuminant color for respective portions of the image representing the scene, together with associated confidence levels. A global prediction of the illuminant color is then computed by combining all the local predictions according to their confidence levels, and the global prediction is then used to correct the whole image.

A limitation of the solution proposed in [Hu+2017], and of most existing illumination estimation methods, is that it assumes that the imaged scene is uniformly illuminated by a single source of light. Indeed, while multiple local predictions are computed in [Hu+2017], they are all estimates of the same illuminant color of a single source of light, and the solution proposed exploits the fact that some portions of the image are better than others to predict the illuminant color of the single source of light. Consequently, the solution proposed in [Hu+2017] does not perform well when applied to images representing scenes illuminated by multiple sources of light.

SUMMARY

The present disclosure aims at improving the situation. In particular, the present disclosure aims at overcoming at least some of the limitations of the prior art discussed above, by proposing a solution for correcting the colors of an input image representing a scene illuminated by multiple sources of light. Also, the present disclosure aims at proposing a solution which, in some embodiments, can be implemented with limited computational complexity.

For this purpose, and according to a first aspect, the present disclosure relates to an image processing method for correcting colors in an input image representing a scene, said image processing method comprising:

processing the input image with a machine learning model, wherein said machine learning model is previously trained to detect a predefined number $N>1$ of sources of light illuminating the scene and to generate N estimated illuminant images associated respectively to the N sources of light, wherein each estimated illuminant image comprises an estimated color of the light emitted by the respective source of light and an estimated contribution image comprising pixels, wherein each pixel value of said estimated contribution image corresponds to an estimated contribution of the light emitted by the respective source of light to the total illumination, by the N sources of light, of a respective portion of the scene represented by said each pixel of the estimated contribution image;

generating a total illuminant image by using the N estimated illuminant images, wherein the total illuminant image comprises pixels, wherein each pixel value of the total illuminant image corresponds to a local color determined by combining the estimated colors of the N sources of light according to the estimated contributions of the corresponding pixels in the estimated contribution images of the N estimated illuminant images; and generating an output image by correcting the colors in the input image based on the total illuminant image.

Hence, the image processing method uses a machine learning model to estimate the illumination cast on the imaged scene.

The machine learning model is previously trained to detect a predefined number $N>1$ of sources of light illuminating the imaged scene. It should be noted that the actual number of sources of light illuminating the imaged scene may actually be different from N, but the machine learning model assumes that there are N sources of light to be detected. Experiments on real images have shown that overestimating the number of sources of light (i.e. considering that there are N sources of light while the scene is actually illuminated by fewer sources of light) did not compromise the color correction performance achieved with this machine learning model. When the scene is actually illuminated by more than N sources of light, the color correction performance is still improved with respect to the performance of prior art solutions which assume that the scene is illuminated by a single source of light.

The previously trained machine learning model predicts, for each of the N sources of light, an estimated color of the respective source of light (for instance as a red-green-blue, RGB, triplet) and an estimated contribution image. Each pixel value of the estimated contribution image predicted for a source of light corresponds to the estimated contribution of the light emitted by this source of light to the total illumination, by the N sources of light, of a respective portion of the scene represented by said each pixel. Indeed, a given source of light may not uniformly illuminate the whole scene, i.e. the illumination cast by a source of light varies spatially in the scene, and the spatial distribution of the illumination on the scene will vary from a source of light to another, depending e.g. on their respective positions relative to the imaged scene. The estimated contribution image associated to a source of light therefore indicates in which portions of the scene (imaged by respective pixels) the illumination cast by this source of light is higher than the illumination cast by the other sources of light, or conversely lower than the illumination cast by the other sources of light, etc.

The estimated color and the estimated contribution image are collectively referred to as estimated illuminant image. The N estimated illuminant images are then combined to produce a total illuminant image. In the total illuminant image, each pixel value corresponds to a local color determined by combining the estimated colors of the N sources of light according to the estimated contributions of the corresponding pixels in the estimated contribution images of the N estimated illuminant images. Hence the local color of a pixel of the total illuminant image accounts for the respective estimated contributions of the N sources of light to the illumination of the portion of the scene represented by this pixel. Accordingly, the local color will typically vary from one pixel to another of the total illuminant image, depending on which source of light is dominant in the illumination of the corresponding portion of the scene.

In specific embodiments, the image processing method may further comprise one or more of the following optional features, considered either alone or in any technically possible combination.

In specific embodiments, the N estimated contribution images generated by the machine learning model have a lower resolution than a resolution of the input image and the image processing method comprises up-sampling the estimated contribution images before generating the total illuminant image and/or up-sampling the total illuminant image before generating the output image. By considering estimated contribution images having a lower resolution than the resolution of the input image, the computational complexity and memory footprint of the machine learning model is reduced compared to using the same resolution as the input image. Hence, the machine learning model may be used even by devices having constrained computational and data storage capabilities, for instance mobile devices such as mobile phones, tablets, digital cameras, etc.

In specific embodiments, the image processing method comprises a prior phase of training the machine learning model, said prior training phase using supervised learning based on a training dataset which comprises training images and associated reference data, wherein:
- each training image represents a training scene illuminated by at most N training sources of light,
- the reference data associated to a training image comprises a reference illuminant image for each training source of light illuminating the training scene, wherein each reference illuminant image comprises a reference color for the respective training source of light and a reference contribution image for the respective training source of light.

In specific embodiments, the image processing method comprises a prior phase of generating the training dataset, and each training image which represents a training scene illuminated by more than one training source of light is generated by combining sub-training images, each sub-training image of a training image representing the same training scene illuminated by a single respective training source of light.

In specific embodiments, the prior training dataset generating phase comprises:
- determining a reference sub-training image for each sub-training image of a training image, wherein the reference sub-training image represents an expected corrected sub-training image in which the reference color of the single training source of light illuminating the training scene in the sub-training image has been corrected,
- determining each reference contribution image of a training image based on all reference sub-training images of said training image.

In specific embodiments, the prior training dataset generating phase comprises:
- computing an intensity of each pixel value in each reference sub-training image,
- computing the value of each pixel of a reference contribution image by evaluating a ratio between, on one hand, the intensity of the corresponding pixel in the corresponding reference sub-training image and, on the other hand, a sum of the intensities of the corresponding pixels in all the reference sub-training images of the corresponding training image.

In specific embodiments, the prior training step comprises iteratively updating the machine learning model to minimize a loss function, wherein the loss function comprises an evaluation of a sum of distances between the estimated illuminant images generated by the machine learning model applied to the training image and their corresponding reference illuminant images.

In specific embodiments, the reference data associated to a training image further comprises a reference training image representing an expected corrected training image, and the loss function further comprises an evaluation of a distance between an output image obtained by applying the machine learning model to the training image and its corresponding reference training image.

In specific embodiments, the machine learning model is a convolutional neural network. For instance, the convolutional neural network comprises an AlexNet, a SqueezeNet or a U-Net.

According to a second aspect, the present disclosure relates to an image processing system for correcting colors in a target image, said image processing system comprising a correcting unit comprising at least one memory and at least one processor, wherein said at least one processor of the correcting unit is configured to:
- process the input image with a machine learning model, wherein said machine learning model is previously trained to detect a predefined number N>1 of sources of light illuminating the scene and to generate N estimated illuminant images associated respectively to the N sources of light, wherein each estimated illuminant image comprises an estimated color of the light emitted by the respective source of light and an estimated contribution image comprising pixels, wherein each pixel value of said estimated contribution image corresponds to an estimated contribution of the light emitted by the respective source of light to the total illumination, by the N sources of light, of a respective portion of the scene represented by said each pixel of the estimated contribution image;
- generate a total illuminant image by using the N estimated illuminant images, wherein the total illuminant image comprises pixels, wherein each pixel value of the total illuminant image corresponds to a local color determined by combining the estimated colors of the N sources of light according to the estimated contributions of the corresponding pixels in the estimated contribution images of the N estimated illuminant images; and
- generate an output image by correcting the colors in the input image based on the total illuminant image.

In specific embodiments, the image processing system may further comprise one or more of the following optional features, considered either alone or in any technically possible combination.

In specific embodiments, the N estimated contribution images generated by the machine learning model have a lower resolution than a resolution of the input image and the at least one processor of the correcting unit is further configured to up-sample the estimated contribution images before generating the total illuminant image and/or to up-sample the total illuminant image before generating the output image.

In specific embodiments, the image processing system comprises a training unit comprising at least one memory and at least one processor, wherein the at least one processor of the training unit is configured to perform a prior training of the machine learning model by supervised learning using a training dataset comprising training images and associated reference data, wherein:
- each training image represents a training scene illuminated by at most N training sources of light,
- wherein the reference data associated to a training image comprises a reference illuminant image for each training source of light illuminating the training scene, wherein each reference illuminant image comprises a reference color for the respective training source of light and a reference contribution image for the respective training source of light.

In specific embodiments, the image processing system comprises a dataset generating unit comprising at least one memory and at least one processor, the at least one processor of the dataset generating unit is configured to generate each training image which represents a training scene illuminated by more than one training source of light by combining sub-training images, wherein each sub-training image of a training image represents the same training scene illuminated by a respective single training source of light.

In specific embodiments, the at least one processor of the data set generating unit is further configured to:
- determine a reference sub-training image for each sub-training image of a training image, wherein the reference sub-training image represents an expected corrected sub-training image in which the reference color of the single training source of light illuminating the training scene in the sub-training image has been corrected,
- determine each reference contribution image of a training image based on all reference sub-training images of said training image.

In specific embodiments, the at least one processor of the dataset generating unit is further configured to:
- compute an intensity of each pixel in each reference sub-training image, and
- compute the value of each pixel of a reference contribution image by evaluating a ratio between, on one hand, the intensity of the corresponding pixel in the corresponding reference sub-training image and, on the other hand, a sum of the intensities of the corresponding pixels in all the reference sub-training images of the corresponding training image.

In specific embodiments, the at least one processor of the training unit is further configured to iteratively update the machine learning model to minimize a loss function and the loss function comprises an evaluation of a sum of distances between the estimated illuminant images generated by the machine learning model applied to the training image and their corresponding reference illuminant images.

In specific embodiments, the reference data associated to a training image further comprises a reference training image representing an expected corrected training image and the loss function further comprises an evaluation of a distance between an output image obtained by applying the machine learning model to the training image and its corresponding reference training image.

In specific embodiments, the machine learning model is a convolutional neural network. For instance, the convolutional neural network comprises an AlexNet, a SqueezeNet or a U-Net.

According to a third aspect, the present disclosure relates to a non-transitory computer readable medium comprising computer readable code which, when executed by one or more processors, cause said one or more processors to correct colors of an input image representing a scene by:
- processing the input image with a machine learning model, wherein said machine learning model is previously trained to detect a predefined number $N>1$ of sources of light illuminating the scene and to generate N estimated illuminant images associated respectively to the N sources of light, wherein each estimated illuminant image comprises an estimated color of the light emitted by the respective source of light and an estimated contribution image comprising pixels, wherein each pixel value of said estimated contribution image corresponds to an estimated contribution of the light emitted by the respective source of light to the total illumination, by the N sources of light, of a respective portion of the scene represented by said each pixel of the estimated contribution image;
- generating a total illuminant image by using the N estimated illuminant images, wherein the total illuminant image comprises pixels, wherein each pixel value of the total illuminant image corresponds to a local color determined by combining the estimated colors of the N sources of light according to the estimated contributions of the corresponding pixels in the estimated contribution images of the N estimated illuminant images; and
- generating an output image by correcting the colors in the input image based on the total illuminant image.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in figures is provided only for illustration purposes and is not meant to limit the present disclosure which may be applied with the same steps executed in a different order.

DESCRIPTION OF EMBODIMENTS

As indicated above, the present disclosure relates inter alia to an image processing method and system for correcting (white balancing) colors of an input image using a machine learning model. For instance, the machine learning model used may be a convolutional neural network, CNN, preferably a fully convolutional neural network, FCNN.

Figure 1:
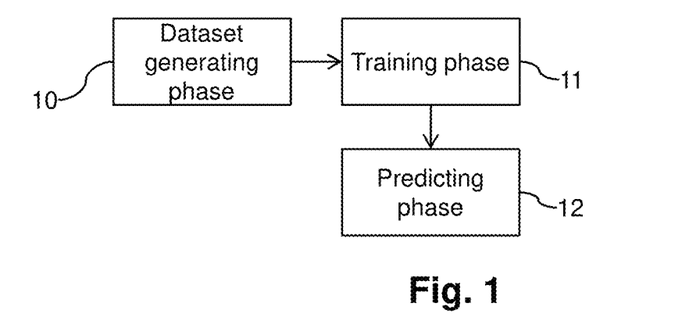
FIG. 1: a diagram representing the main phases of supervised learning for a machine learning model.

The machine learning model is preferably trained via supervised learning. It is well known that, in such a case, the machine learning model undergoes mainly two different phases, as represented in FIG. 1, namely:
- a training phase 11 during which the machine learning model is trained in order to learn how to correct the colors of images, by using a training dataset, said training dataset, comprising training images for which reference data (a.k.a. "ground truth" data), representative of the expected result to be provided by the machine learning model, is available,
- a predicting phase 12 during which the trained machine learning model is then applied to input images for which color correction is requested.

As illustrated by FIG. 1, the training dataset can be generated during a dataset generating phase 10 and used during the training phase 11.

It is emphasized that the dataset generating phase 10, the training phase 11 and the predicting phase 12 can be executed separately, independently from one another, the training phase 11 receiving as input the training dataset generated during the dataset generating phase 10 and the predicting phase 12 receiving as input the machine learning model trained during the training phase 11. For instance, the dataset generating phase 10 may be executed by a dataset generating unit 20, the training phase 11 may be executed by a training unit 30 and the predicting phase 12 may be executed by a correcting unit 40. The dataset generating unit 20, the training unit 30 and the correcting unit 40 may be all separate, i.e. they may be embedded in respective separate computing systems, or two or more of the dataset generating unit 20, the training unit 30 and the correcting unit 40 may be embedded in a same computing system (in which case they can share hardware resources such as processors, memories, etc.). In the present disclosure, an image processing system may comprise at least one among the dataset generating unit 20, the training unit 30 and the correcting unit 40, and an image processing method 50 may comprise at least one among the dataset generating phase 10, the training phase 11 and the predicting phase 12

Figure 2:
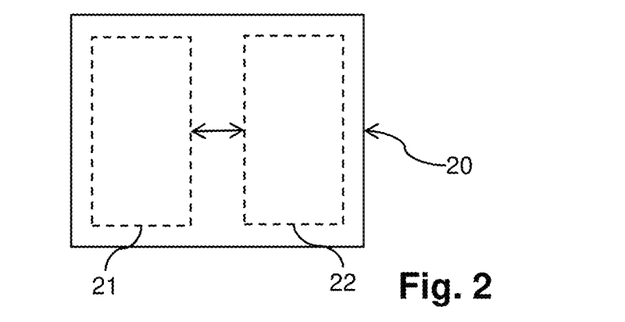
FIG. 2: a schematic representation of an exemplary embodiment of a dataset generating unit.

FIG. 2 represents schematically an exemplary embodiment of a dataset generating unit 20. As illustrated by FIG. 2, the dataset generating unit 20 comprises one or more processors 21 and one or more memories 22. The one or more processors 21 may include for instance a central processing unit (CPU), a graphics processing unit (GPU), a neural processing unit (NPU), a digital signal processor (DSP), a field-programmable gate array (FPGA), an application specific integrated circuit (ASIC), etc. The one or more memories 22 may include any type of computer readable volatile and non-volatile memories (magnetic hard disk, solid-state disk, optical disk, electronic memory, etc.). The one or more memories 22 may store a computer program product, in the form of a set of program-code instructions to be executed by the one or more processors 21 in order to implement all or part of the steps of the dataset generating phase 10. Once the training dataset has been generated, it can be stored in the one or more memories 22 and/or it can be stored in a remote database (not shown in the figures) and/or it can be sent to the training unit 30.

Figure 3:
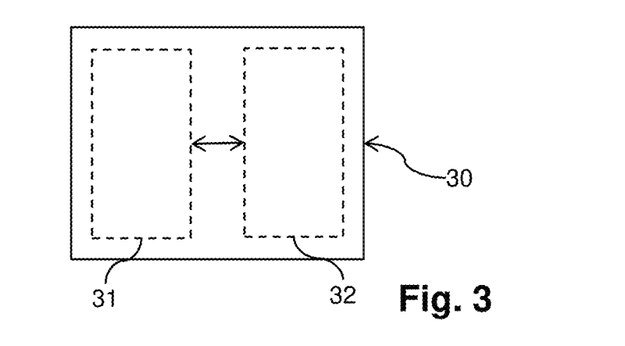
FIG. 3: a schematic representation of an exemplary embodiment of a training unit.

FIG. 3 represents schematically an exemplary embodiment of a training unit 30. As illustrated by FIG. 3, the training unit 30 comprises one or more processors 31 and one or more memories 32. The one or more processors 31 may include for instance a CPU, a GPU, a NPU, a DSP, an FPGA, an ASIC, etc. The one or more memories 32 may include any type of computer readable volatile and non-volatile memories (magnetic hard disk, solid-state disk, optical disk, electronic memory, etc.). The one or more memories 32 may store a computer program product, in the form of a set of program-code instructions to be executed by the one or more processors 31 in order to implement all or part of the steps of the training phase 11 of the machine learning model used for color correction. For instance, the training dataset may be stored in the one or more memories 32 after it has been retrieved from e.g. a remote database or directly from the dataset generating unit 20. Once the machine learning model has been trained, it can be stored in the one or more memories 32 and/or it can be stored in a remote database (not shown in the figures) and/or it can be sent to the correcting unit 40.

Figure 4:
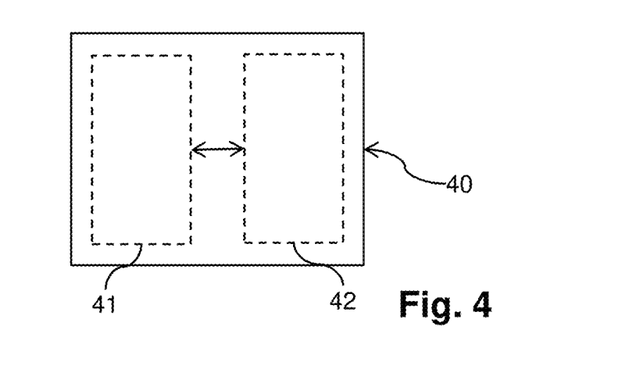
FIG. 4: a schematic representation of an exemplary embodiment of a correcting unit.

FIG. 4 represents schematically an exemplary embodiment of a correcting unit 40. As illustrated by FIG. 4, the correcting unit 40 comprises one or more processors 41 and one or more memories 42. The one or more processors 41 may include for instance a CPU, a GPU, a NPU, a DSP, a FPGA, an ASIC, etc. The one or more memories 42 may include any type of computer readable volatile and non-volatile memories (magnetic hard disk, solid-state disk, optical disk, electronic memory, etc.). The one or more memories 42 may store a computer program product, in the form of a set of program-code instructions to be executed by the one or more processors 41 in order to correct the colors an input image by using a trained machine learning model. For instance, the trained machine learning model may be stored in the one or more memories 42 of the correcting unit 40 after it has been retrieved from e.g. a remote database or directly from the training unit 30.

Figure 5:
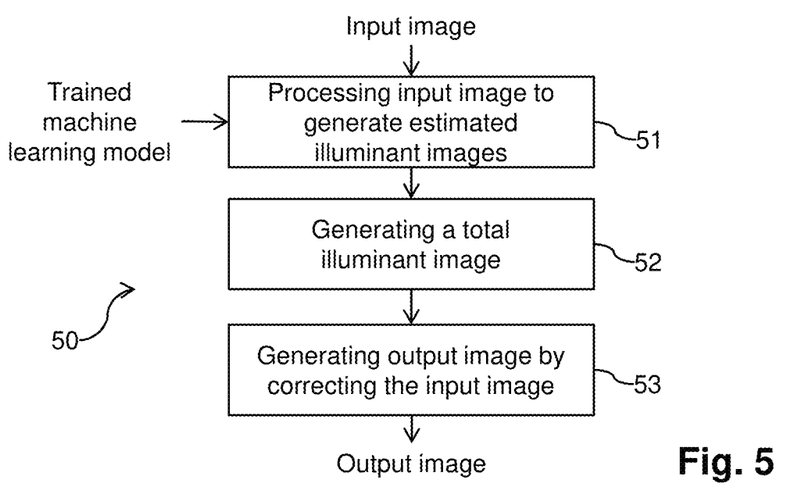
FIG. 5: a diagram representing the main steps of an exemplary embodiment of an image processing method for correcting colors of an input image using a trained machine learning model.

FIG. 5 represents schematically the main steps of an image processing method 50 for correcting (white balancing) the colors of an input image representing a scene, based on a trained machine learning model, which are carried out by the correcting unit 40.

As illustrated by FIG. 5, the image processing method 50 comprises a step 51 of processing an input image with the trained machine learning model, which corresponds to the predicting phase 12. The machine learning model is trained to detect a predefined number $N>1$ of sources of light illuminating the scene and is configured to generate N estimated illuminant images associated respectively to the N sources of light. For instance, $2 \leq N \leq 10$ or, preferably, $3 \leq N \leq 5$. As discussed above, the actual number L of sources of light illuminating the imaged scene in the input image needs not to be known and may actually be different from N (including L=1), but the machine learning model assumes that there are N sources of light to be detected.

In the sequel, the input image is assumed in a non-limitative manner to have a size W×H×Ch, wherein:
- W corresponds to a number of pixels along a width dimension of the input image,
- H corresponds to a number of pixels along a height dimension of the input image,
- Ch corresponds to a number of color channels of the image, typically Ch=3 and the color channels may correspond to the red-green-blue (RGB) channels.

In the sequel, any estimated illuminant image is assumed in a non-limitative manner to have a size W'×H'×Ch, wherein:
- W'≤W corresponds to a number of pixels along a width dimension of the estimated illuminant image,
- H'≤H corresponds to a number of pixels along a height dimension of the estimated illuminant image.

In some cases, W'<W and/or H'<H, in which case each estimated illuminant image has a lower resolution than the resolution of the input image. If we have both W'=W and H'=H, then each estimated illuminant image has the same resolution as the resolution of the input image.

Each estimated illuminant image is denoted $\widetilde{illum}_n$ in the sequel, with $1 \le n \le N$. Each estimated illuminant image $\widetilde{illum}_n$ is composed of W'×H' pixels, and the value $\widetilde{illum}_n(x, y)$ of a given pixel (x, y) (with $1 \le x \le W'$ and $1 \le y \le H'$) corresponds to a vector of size Ch representing e.g. an RGB triplet.

As indicated above, each estimated illuminant image $\widetilde{illum}_n$ is associated to a source of light of index n. Each estimated illuminant image $\widetilde{illum}_n$ includes an estimated color $\hat{I}_n$ (vector of size Ch) of the light emitted by the source of light of index n and an estimated contribution image $\hat{C}_n$ of size W'×H'×1 comprising W'×H' pixels. Each pixel value $\hat{C}_n(x, y)$ of an estimated contribution image $\hat{C}_n$ is a scalar value representative of an estimated contribution of the light emitted by the source of light of index n to the total illumination, by the N sources of light, of a respective portion of the scene represented by said pixel (x, y). For instance, the estimated illuminant image $\widetilde{illum}_n$ is such that:

$$\widetilde{illum}_n(x,y) = \hat{I}_n \times \hat{C}_n(x,y)$$

Assuming that $\hat{I}_n$ corresponds to an RGB triplet ($\hat{R}_n$, $\hat{G}_n$, $\hat{B}_n$), this yields:

$$\widetilde{illum}_n(x,y) = (\hat{R}_n \times \hat{C}_n(x,y), \hat{G}_n \times \hat{C}_n(x,y), \hat{B}_n \times \hat{C}_n(x,y))$$

As discussed above, the pixel value $\hat{C}_n(x, y)$ represents the estimated contribution of the source of light of index n to the total illumination of the portion of the scene represented by pixel (x, y). Preferably, the machine learning model is trained to predict normalized estimated contributions i.e.:

$$\sum_{n=1}^{N} \hat{C}_n(x,y) = 1$$

for any $1 \le x \le W'$ and any $1 \le y \le H'$. In such a case, $0 \le \hat{C}_n(x, y) \le 1$. If $\hat{C}_n(x, y)=1$, the portion of the scene associated to the pixel (x, y) is illuminated only by the source of light of index n. If $\hat{C}_n(x, y)=0$, the portion of the scene associated to the pixel (x, y) is illuminated only by the other sources of light, i.e. by the sources of light of index m≠n.

As illustrated by FIG. 5, the image processing method 50 comprises a step 52 of generating a total illuminant image by using the N estimated illuminant images $\widetilde{illum}_n$. The total illuminant image is denoted $\overline{corr}$ and is of size W'×H'×Ch. The total illuminant image $\overline{corr}$ comprises W'×H' pixels. Each pixel value $\overline{corr}(x, y)$ corresponds to a local color (vector of size Ch) determined by combining the estimated colors $\hat{I}_n$ of the N sources of light according to the estimated contributions $\hat{C}_n(x, y)$ of the corresponding pixels (x, y) in the estimated contribution images $\hat{C}_n$ of the N estimated illuminant images. For instance, with normalized estimated contributions:

$$\overline{corr}(x,y) = \sum_{n=1}^{N} \widetilde{illum}_n(x,y) = \sum_{n=1}^{N} \hat{I}_n \times \hat{C}_n(x,y)$$

Assuming that $\hat{I}_n$ corresponds to an RGB triplet ($\hat{R}_n$, $\hat{G}_n$, $\hat{B}_n$), then $\overline{corr}(x, y)$ corresponds to an RGB triplet ($\hat{R}(x, y)$, $\hat{G}(x, y)$, $\hat{B}(x, y)$) with:

$$\hat{R}(x,y) = \sum_{n=1}^{N} \hat{R}_n \times \hat{C}_n(x,y)$$

$$\hat{G}(x,y) = \sum_{n=1}^{N} \hat{G}_n \times \hat{C}_n(x,y),$$

$$\hat{B}(x,y) = \sum_{n=1}^{N} \hat{B}_n \times \hat{C}_n(x,y)$$

Hence, the local color $\overline{corr}(x, y)$ varies from a pixel to another and depends for each pixel (x, y) on the respective estimated contributions of the N sources of light to the total illumination of the portion of the scene represented by said pixel (x, y). Hence the total illuminant image $\overline{corr}$ represents the total illumination received by each portion of the imaged scene, which varies from a portion to another depending on the configuration of the N sources of light with respect to the imaged scene.

It should be noted that the machine learning model may be trained to generate the total illuminant image $\overline{corr}$, in which case the step 51 of processing the input image and the step 52 of generating the total illuminant image $\overline{corr}$ are executed simultaneously by the correcting unit 40.

As illustrated by FIG. 5, the image processing method 50 comprises a step 53 of generating an output image by correcting the colors in the input image based on the total illuminant image. If we denote by IN the input image and by OUT the output image, and if we assume that the total illuminant image $\overline{corr}$ has the same resolution as the input image IN then the color correction may be carried out pixelwise as follows:

$$OUT(x, y) = \frac{IN(x, y)}{\overline{corr}(x, y)}$$

wherein the division operation is carried separately on each color channel. Hence, if IN(x, y)=($R_{IN}(x, y)$, $G_{IN}(x, y)$, $B_{IN}(x, y)$), then:

$$OUT(x, y) = \left( \frac{R_{IN}(x, y)}{\hat{R}(x, y)}, \frac{G_{IN}(x, y)}{\hat{G}(x, y)}, \frac{B_{IN}(x, y)}{\hat{B}(x, y)} \right)$$

If the total illuminant image $\overline{corr}$ has a lower resolution than the resolution of the input image IN, then each local color $\overline{corr}(x, y)$ may be used similarly to correct a corresponding patch of pixels in the input image IN.

In a preferred embodiment, if the estimated illuminant images $\widetilde{illum}_n$ have a lower resolution than the input image IN, they can be up-sampled in order to achieve the same resolution as the resolution of the input image IN, before executing the step 52 of generating the total illuminant image. In an alternate embodiment, it is possible to up-sample only the total illumination image $\overline{corr}$, after the step 52 of generating the total illuminant image $\overline{corr}$ and before the step 53 of generating the output image OUT. In yet another alternate embodiment, it is possible to up-sample the illuminant images $\widetilde{illum}_n$ to an intermediate resolution and to compute the total illumination image $\overline{corr}$ at this intermediate resolution, and to then up-sample the total illuminant image $\overline{Corr}$ to the same resolution as the input image IN, before executing the step 53 of generating the output image OUT.

As indicated before, the machine learning model may be trained during a training phase 11 carried out by the training unit 30, via supervised learning. In such a case, the training unit 30 uses a training dataset to train the machine learning model, wherein the training dataset includes training images and associated reference data (a.k.a. "ground truth" data). The reference data associated to a training image represents expected results to be provided by the machine learning model when applied to said training image.

For instance, a training image in the training dataset represents a training scene illuminated by N training sources of light. The reference data associated to a training image comprises a reference illuminant image for each training source of light illuminating the training scene, wherein each reference illuminant image comprises a reference color for the respective training source of light and a reference contribution image for the respective training source of light.

In the sequel, it is assumed in a non-limitative manner that each training image has a size W×H×Ch. However, it is emphasized that, in practice, the dimensions of the training images in the training phase 11 may be different from the dimensions of the input image in the predicting phase 12 and/or the dimensions may vary from one training image to another.

Each reference illuminant image is assumed in a non-limitative manner to have a size W'×H'×Ch. Similarly, the dimensions of the reference illuminant images in the training phase 11 may be different from the dimensions of the estimated illuminant images in the predicting phase 12 and/or the dimensions may vary from one training image to another. In some cases, the ratio W/W' may be the same for all training images and all input images and the ratio H/H' may be the same for all training images and all input images. However, it is also possible to consider, in other examples, different ratios W/W' and/or H/H' for the training images and the input images.

In the sequel, we assume in a non-limitative manner that W'=W and =H, i.e. that each reference illuminant image has the same resolution as the resolution of its associated training image.

Hence, a training image, denoted TR, is composed of W×H pixels, and the value TR (x, y) of a given pixel (x, y) (with 1≤x≤W and 1≤y≤H) corresponds to a vector of size Ch representing e.g. an RGB triplet.

Each reference illuminant image is denoted $Illum_n^{GT}$ in the sequel, with 1≤n≤N. Each reference illuminant image $Illum_n^{GT}$ is composed of W×H pixels, and the value $Illum_n^{GT}$ (x, y) of a given pixel (x, y) (with 1≤x≤W and 1≤y≤H) corresponds to a vector of size Ch representing e.g. an RGB triplet.

As indicated above, each reference illuminant image $Illum_n^{GT}$ is associated to a training source of light of index n. Each reference illuminant image $Illum_n^{GT}$ includes a reference color $I_n^{GT}$ (vector of size Ch) of the light emitted by the training source of light of index n and a reference contribution image $C_n^T$ of size W×H×1 comprising W×H pixels. Each pixel value $C_n^{GT}(x, y)$ of a reference contribution image $C_n^{GT}$ is a scalar value representative of a reference contribution of the light emitted by the training source of light of index n to the total illumination, by the N sources of light, of a respective portion of the training scene represented by said pixel (x, y). For instance, the reference illuminant image $Illum_n^{GT}$ is such that:

$$Illum_n^{GT}(x,y) = I_n^{GT} \times C_n^{GT}(x,y)$$

Assuming that $I_n^{GT}$ corresponds to an RGB triplet ($R_n^{GT}$, $G_n^{GT}$, $B_n^{GT}$):

$$Illum_n^{GT}(x,y) = (R_n^{GT} \times C_n^{GT}(x,y), G_n^{GT} \times C_n^{GT}(x,y), B_n^{GT} \times C_n^{GT}(x,y))$$

Preferably, the reference contributions are normalized, in order to train the machine learning model to predict normalized estimated contributions:

$$\Sigma_{n=1}^{N} C_n^{GT}(x,y) = 1$$

for any 1≤x≤W and any 1≤y≤H.

All or part of the training images in the training dataset represent training scenes illuminated by N training sources of light. In some embodiments, it is possible to include, in the training dataset, training images which represent training scenes illuminated by fewer than N training sources of light. By doing so, the machine learning model will perform well even when the input image is illuminated by fewer than N sources of light. For instance, for a training image representing a training scene illuminated by M training sources of light, with 1≤M<N, then it is possible to e.g. consider N reference illuminant images $Illum_n^{GT}$ (1≤n≤N) with (N−M) void reference illuminant images. Assuming Ch=3, a void reference illuminant image may be such that:

$$C_n^{GT}(x,y) = 0$$

$$Illum_{n'}^{GT}(x,y) = (0,0,0)$$

for any M<n'≤N, and for any 1≤x≤W and any 1≤y≤H.

The training dataset comprises a plurality of training images (and associated reference data) which differ by one or more parameters. For instance, the one or more parameters which vary from one training image to another may include:

the training scene imaged by the training image,
the number of training sources of light illuminating the training scene,
the respective reference colors $I_n^{GT}$ of the training sources of light,
the respective intensities of the training sources of light,
the respective positions of the training sources of light with respect to the imaged training scene, etc.

For instance, during the training phase 11, the machine learning model is iteratively updated for each training image in order to minimize a predefined loss function, until a predefined stop criterion is satisfied. This iterative process is repeated for each training image. However, the present disclosure may be applied with any supervised learning scheme known to the skilled person.

For each training image, the loss function compares the results obtained with the machine learning model with the expected results provided by and/or determined based on the reference data.

Figure 6:
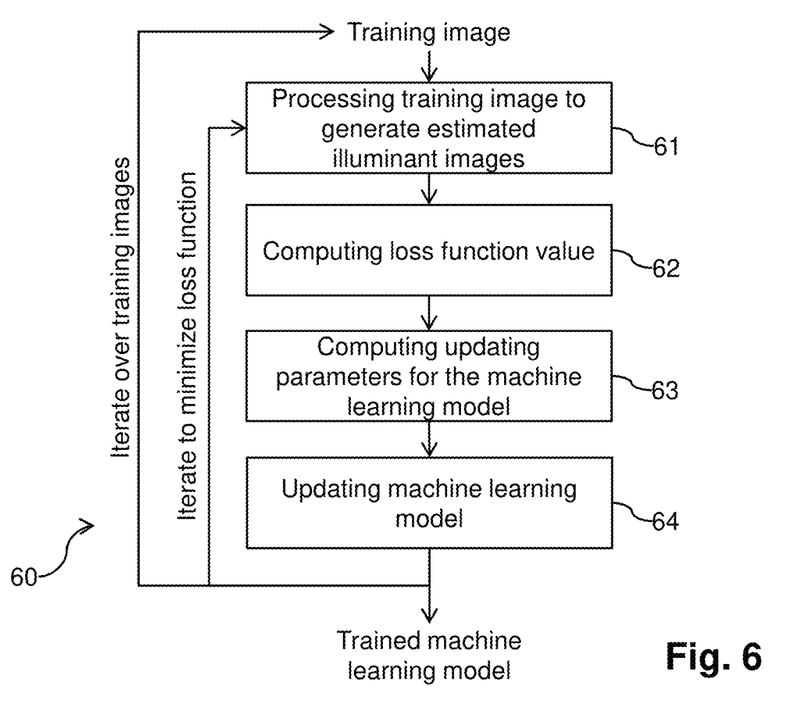
FIG. 6: a diagram representing the main steps of an exemplary embodiment of a training phase for generating a trained machine learning model.

FIG. 6 represents schematically the main steps of an exemplary embodiment of the training phase 11, carried out by the training unit 30.

As illustrated by FIG. 6, the training phase 11 comprises a step 61 of processing a training image with the machine learning model, thereby obtaining N estimated illuminant images for the training image.

Each estimated illuminant image is denoted $\widehat{Illum}_n^{GT}$ in the sequel, with 1≤n≤N. Each reference illuminant image $Illum_n^{GT}$ is composed of W×H pixels, and the value $\text{Illum}_n^{GT}$ (x, y) of a given pixel (x, y) (with $1 \leq x \leq W$ and $1 \leq y \leq H$) corresponds to a vector of size Ch representing e.g. an RGB triplet.

As indicated above, each estimated illuminant image $\widehat{\text{Illum}}_n^{GT}$ is associated to a training source of light of index n. Each estimated illuminant image $\widehat{\text{Illum}}_n^{GT}$ includes a reference color $\hat{I}_n^{GT}$ (vector of size Ch) of the light emitted by the training source of light of index n and an estimated contribution image $\hat{C}_n^{GT}$ of size W×H×1 comprising W×H pixels. Each pixel value $\hat{C}_n^{GT}(x, y)$ of an estimated contribution image $\hat{C}_n^{GT}$ is a scalar value representative of an estimated contribution of the light emitted by the training source of light of index n to the total illumination, by the N sources of light, of a respective portion of the training scene represented by said pixel (x, y). For instance, the estimated illuminant image $\widehat{\text{Illum}}_n^{GT}$ is such that:

$$\widehat{\text{Illum}}_n^{GT}(x,y) = \hat{I}_n^{GT} \times \hat{C}_n^{GT}(x,y)$$

Assuming that $\hat{I}_n^{GT}$ corresponds to an RGB triplet ($\hat{R}_n^{GT}$, $\hat{G}_n^{GT}$, $\hat{B}_n^{GT}$):

$$\widehat{\text{Illum}}_n^{GT}(x,y) = (\hat{R}_n^{GT} \times \hat{C}_n^{GT}(x,y), \hat{G}_n^{GT} \times \hat{C}_n^{GT}(x,y), \hat{B}_n^{GT} \times \hat{C}_n^{GT}(x,y))$$

As illustrated by FIG. 6, the training phase 11 comprises a step 62 of computing the value of the loss function value based on the reference data of the training image and based on the N estimated illuminant images. Basically, the loss function value compares the reference data with the estimated data and is minimal when the reference data and the estimated data are identical.

The training phase 11 comprises a step 63 of computing updating parameters for the machine learning model. Indeed, the machine learning model (e.g. CNN) is defined by a set of parameters, and the training phase 11 aims at identifying optimal values for this set of parameters, i.e. values of the set of parameters which optimize the loss function. The updating parameters are therefore modifications to the set of parameters which, in principle, should cause the machine learning model to generate estimated illuminant images which further reduce the loss function value. Such updating parameters may be determined in a conventional manner by e.g. gradient descent methods.

The training phase 11 comprises a step 64 of updating the set of parameters of the machine learning model based on the updating parameters.

As illustrated by FIG. 6, the steps 61, 62, 63 and 64 are iterated for each training image of the training dataset, until a predefined stop criterion is satisfied. When all training images have been processed, the training phase may stop, and the machine learning model obtained when the stop criterion is satisfied corresponds to the trained machine learning model used by the correcting unit 40 to correct an input image during the predicting phase 12.

In preferred embodiments, the loss function may comprise an evaluation of a sum of pixelwise distances between the estimated illuminant images $\widehat{\text{Illum}}_n^{GT}$ generated by the machine learning model applied to the training image and their corresponding reference illuminant images $\text{Illum}_n^{GT}$. For instance, the distance considered may be based on a p-norm, preferably a 2-norm (a.k.a. L2 norm), between the pixels' values. The loss function may for instance be expressed as:

$$\text{loss}_1 = \sum_{n=1}^{N} \sum_{x=1}^{W} \sum_{y=1}^{H} \|\widehat{\text{Corr}}(x,y) - \text{Illum}_n^{GT}(x,y)\|_2^2$$

wherein $\|\cdot\|_2$ is the 2-norm.

Such a loss function $\text{loss}_1$ aims at training the machine learning model to correctly predict the estimated illuminant images $\widehat{\text{Illum}}_n^{GT}(x, y)$ (and therefore the estimated illuminant images $\widehat{\text{Illum}}_n$ during the predicting phase 12). As discussed above, some of the reference illuminant images $\text{Illum}_n^{GT}$ may be void reference illuminant images if the training image represents a training scene illuminated by fewer than N training sources of light.

In other embodiments, the loss function may include an evaluation of a pixelwise distance between an output image $\overline{OUT}^{GT}$ obtained by applying the machine learning model to the training image and a corresponding reference training image $OUT^{GT}$ representing the expected corrected (white-balanced) training image. For instance, the distance considered may be an angular distance between the colors of the pixels (e.g. RGB vectors), preferably evaluated by an inverse cosine arccos function. For instance, the loss function may be expressed as:

$$\text{loss}_2 = \frac{1}{H \times W} \sum_{k=1}^{W} \sum_{y=1}^{H} \frac{180}{\pi} \arccos(\overline{OUT}^{GT}(x, y), OUT^{GT}(x, y))$$

The output image $\overline{OUT}^{GT}$ is for instance computed by performing the following pixelwise correction:

$$\overline{OUT}^{GT}(x, y) = \frac{TR(x, y)}{\sum_{n=1}^{N} \widehat{\text{Illum}}_n^{GT}(x, y)}$$

Assuming that TR(x, y) is a RGB triplet ($R_{TR}(x, y)$, $G_{TR}(x, y)$, $B_{TR}(x, y)$) then $\overline{OUT}^{GT}(x, y)$ can be computed as:

$$\overline{OUT}^{GT}(x, y) = \left( \frac{R_{TR}(x, y)}{\sum_{n=1}^{N} \hat{R}_n^{GT} \times \hat{C}_n^{GT}(x, y)}, \frac{G_{TR}(x, y)}{\sum_{n=1}^{N} \hat{G}_n^{GT} \times \hat{C}_n^{GT}(x, y)}, \frac{B_{TR}(x, y)}{\hat{B}_n^{GT} \times \hat{C}_n^{GT}(x, y)} \right)$$

It should be noted that, in some embodiments, it is possible to combine the loss functions $\text{loss}_1$ and $\text{loss}_2$, for instance by considering a loss function:

$$\text{loss} = \lambda_1 \times \text{loss}_1 + \lambda_2 \times \text{loss}_2$$

wherein $\lambda_1$ and $\lambda_2$ are predetermined weighting factors. Combining the loss functions $\text{loss}_1$ and $\text{loss}_2$ enables to achieve better prediction results.

Of course, other loss functions may be considered during the training phase 11 and the choice of a specific loss function corresponds to a specific embodiment of the present disclosure.

As indicated before, the training dataset may be generated during a dataset generating phase 10 carried out by a dataset generating unit 20.

Figure 7:
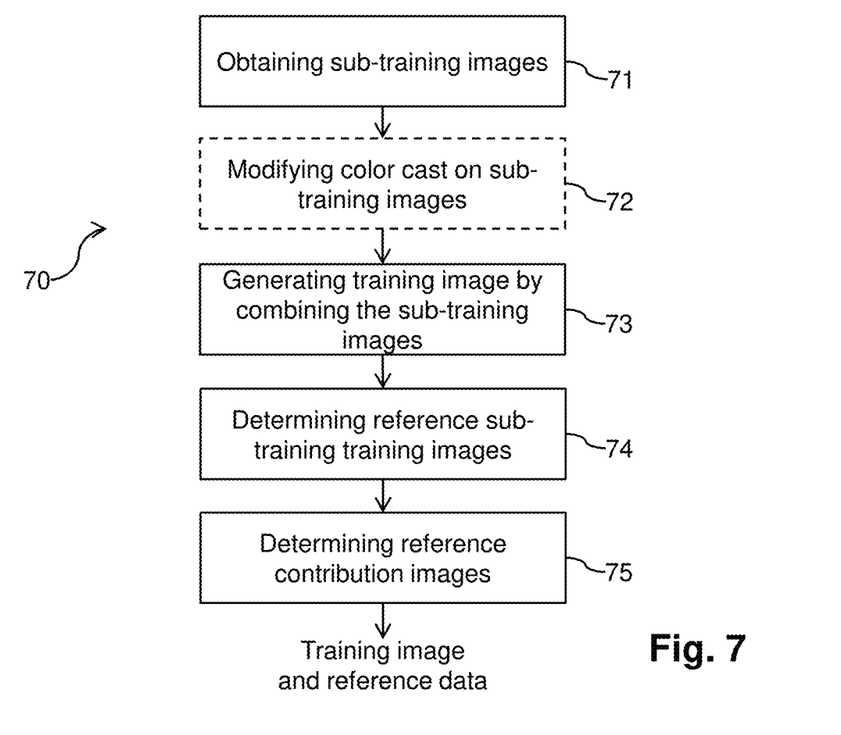
FIG. 7: a diagram representing the main steps of an exemplary embodiment of a dataset generating phase for generating a training dataset to be used for training a machine learning model.

FIG. 7 represents schematically the main steps of an exemplary embodiment of the dataset generating phase 10, carried out by the dataset generating unit 20. More specifically, FIG. 7 represents the main steps carried out to generate a training image and its associated reference data. We first assume that the training image represents a training scene illuminated by N training sources of light, and then we discuss how the generation of a training image and of its associated reference data may be modified when the training image represents a training scene illuminated by fewer training sources of light.

As illustrated by FIG. 7, the dataset generating phase 10 comprises a step 71 of obtaining N sub-training images, each sub-training image representing the same training scene illuminated by a single respective training source of light.

Figure 8:
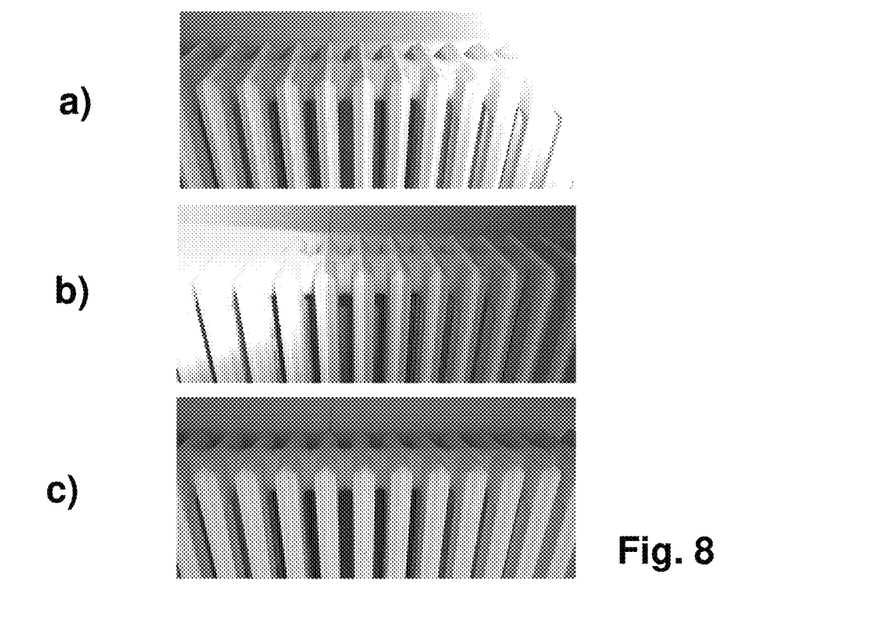
FIG. 8: examples of sub-training images representing a same training scene illuminated by a single source of light in different positions with respect to the training scene.

The position of the source of light with respect to the imaged training scene varies from one sub-training image to another. FIG. 8 represents schematically examples of three different sub-training images representing the same training scene illuminated from different positions of the training source of light with respect to the training scene. More specifically, part a) of FIG. 8 represents the training scene illuminated from the right, part b) of FIG. 8 represents the training scene illuminated from the left and part c) of FIG. 8 represents the training scene illuminated from the bottom.

Preferably, the color of the source of light also varies from one sub-training image to another. For instance, the sub-training images may be captured by different training sources of light having different respective colors. In such a case, the color of the training source of light used for acquiring a sub-training image is obtained together with the sub-training image and is used as the reference color of the training source of light used for acquiring this sub-training image.

If the same training source of light is used for acquiring all the sub-training images (by moving the training source of light), the same color will be cast on all sub-training images. In preferred embodiments, and as illustrated by FIG. 7, the dataset generating phase comprises in such a case an optional step 72 of modifying the color cast on all or part of the sub-training images. It should be noted that such a modification of the color cast may also be applied when different training sources of light are used to acquire the sub-training images. For instance, if we denote by $SUB_n$ the sub-training image of index n and by $WB_n$ (e.g. a RGB triplet) the color of the training source of light used to acquire the sub-training image $SUB_n$, then its color may be modified by applying a color modification factor $tint_n$ (e.g. a RGB triplet), wherein the color modification factor $tint_n$ is for instance selected randomly. Hence, the color modification factor $tint_n$ typically varies from one sub-training image to another. The value of the pixel $SUB_n$ (x, y) is typically modified as follows:

$$SUB'_n(x,y) = tint_n \times SUB_n(x,y) = tint_n \times WB_n \times SUB_n^{WB}(x,y)$$

wherein the multiplication operation is carried separately on each color channel, $SUB'_n$ corresponds to the modified sub-training image of index n and $SUB_n^{WB}$ corresponds to a reference sub-training image representing the expected corrected (white balanced) sub-training image in which the color of the training source of light illuminating the training scene has been corrected:

$$SUB_n^{WB}(x, y) = \frac{SUB_n(x, y)}{WB_n}$$

The reference color $I_n^{GT}$ for the training source of light of index n (virtual in that its color has been modified by $tint_n$) is equal in this case to $I_n^{GT} = tint_n \times WB_n$.

For instance, the reference training image $OUT^{GT}$ representing the expected corrected (white-balanced) training image, considered in the loss function $loss_2$, may be computed as:

$$OUT^{GT}(x, y) = \frac{1}{N}\sum_{n=1}^{N} SUB_n^{WB}(x, y)$$

As illustrated by FIG. 7, the dataset generating phase 10 comprises a step 73 of generating the training image by combining the N sub-training images $SUB'_n$ (or $SUB_n$ if no color modification was applied), for instance as:

$$TR(x, y) = \frac{1}{N}\sum_{n=1}^{N} SUB'_n(x, y)$$

In order to determine the N reference illuminant images $Illum_n^{GT}$, the dataset generating phase 10 comprises, in the non-limitative example illustrated by FIG. 7, a step 74 of determining the reference sub-training images $SUB_n^{WB}$, for instance computed as discussed above. The dataset generating phase 10 further comprises a step 75 of determining each reference contribution image $C_n^{GT}$ of the training image by using all N reference sub-training images $SUB_n^{WB}$. For instance, the step 75 of determining each reference contribution image $C_n^{GT}$ of the training image comprises determining an intensity of each pixel value $SUB_n^{WB}(x, y)$ in each reference sub-training images $SUB_n^{WB}$. For instance, assuming that the pixel value $SUB_n^{WB}(x, y)$ corresponds to an RGB triplet ($R_n^{WB}(x, y)$, $G_n^{WB}(x, y)$, $B_n^{WB}(x, y)$), then its intensity $c_n^{WB}(x, y)$ may be computed as follows:

$$c_n^{WB}(x,y) = 0.2126 \times R_n^{WB}(x,y) + 0.7152 \times G_n^{WB}(x,y) + 0.0722 \times B_n^{WB}(x,y)$$

Then the pixel value (reference contribution) $C_n^{GT}(x, y)$ of the reference contribution image $C_n^{GT}$ of index n is computed based on all N intensities $c_n^{WB}(x, y)$, $1 \le n \le N$. For instance, if the reference contributions are normalized, the reference contribution $C_n^{GT}(x, y)$ of the reference contribution image $C_n^{GT}$ of index n may be computed as follows:

$$C_n^{GT}(x, y) = \frac{c_n^{WB}(x, y)}{\sum_{n'=1}^{N} c_{n'}^{WB}(x, y)}$$

and the reference illuminant image $Illum_n^{GT}$ of index n may be computed as:

$$Illum_n^{GT}(x,y) = I_n^{GT} \times C_n^{GT}(x,y)$$

As discussed above, some of the training images may represent training scenes illuminated by fewer than N training sources of light. For instance, for a training image representing a training scene illuminated by M training sources of light, with $1 \le M < N$, then it is possible to consider only M sub-training images and:

$$OUT^{GT}(x, y) = \frac{1}{M}\sum_{m=1}^{M} SUB_m^{WB}(x, y)$$

$$TR(x, y) = \frac{1}{M}\sum_{m=1}^{M} SUB'_m(x, y)$$

$$C_m^{GT}(x, y) = \frac{c_m^{WB}(x, y)}{\sum_{m'=1}^{M} c_{m'}^{WB}(x, y)}$$

Also, M reference illuminant images may be computed as $Illum_m^{GT}(x, y) = I_m^{GT} \times C_m^{GT}(x, y)$, $1 \le m \le M$, while (N–M) reference illuminant images may be void reference illuminant images as discussed above.

As indicated above, the machine learning model is for instance a CNN, preferably a FCNN.

For instance, it is possible to use a similar architecture as in [Hu+2017], which relies on a AlexNet or a SqueezeNet with additional convolutional layers. However, in the present disclosure, the final dimensions are W'×H'×(N×Ch), i.e. N×Ch feature maps of dimension W'×H' are generated, which correspond to the N estimated illuminant images. In such a case, the resolution of the estimated illuminant images is lower than the resolution of the input image, for instance W'=W/32 and H'=H/32.

According to another example, the machine learning model includes a U-Net. Such a U-Net comprises an encoder which successively down-samples the image (i.e. training image during the training phase 11 or input image during the predicting phase 12) and a decoder successively up-samples back to the original resolution the image received from the encoder. In such a case, we may have W'=W and H'=H.

More generally speaking, any suitable architecture may be considered for the machine learning model, in particular any suitable CNN architecture adapted to generate at least N×Ch feature maps of dimension W'×H'.

It is emphasized that the present invention is not limited to the above exemplary embodiments. Variants of the above exemplary embodiments are also within the scope of the present invention.

REFERENCES

[Hu+2017] Y. Hu, B. Wang and S. Lin: "$FC^4$: Fully Convolutional Color Constancy with Confidence-Weighted Pooling", 2017 IEEE Conference on Computer Vision and Pattern Recognition (CVPR), 2017, pp. 330-339

The invention claimed is:

1. An image processing method for correcting colors in an input image representing a scene, said image processing method comprising:
   processing the input image with a machine learning model, wherein said machine learning model is previously trained to detect a predefined number $N>1$ of sources of light illuminating the scene and to generate N estimated illuminant images associated respectively to the N sources of light, wherein each estimated illuminant image comprises an estimated color of the light emitted by the respective source of light and an estimated contribution image comprising pixels, wherein each pixel value of said estimated contribution image corresponds to an estimated contribution of the light emitted by the respective source of light to the total illumination, by the N sources of light, of a respective portion of the scene represented by said each pixel of the estimated contribution image;
   generating a total illuminant image by using the N estimated illuminant images, wherein the total illuminant image comprises pixels, wherein each pixel value of the total illuminant image corresponds to a local color determined by combining the estimated colors of the N sources of light according to the estimated contributions of the corresponding pixels in the estimated contribution images of the N estimated illuminant images; and
   generating an output image by correcting the colors in the input image based on the total illuminant image.

2. The image processing method according to claim 1, wherein the N estimated contribution images generated by the machine learning model have a lower resolution than a resolution of the input image and the image processing method comprises up-sampling the estimated contribution images before generating the total illuminant image and/or up-sampling the total illuminant image before generating the output image.

3. The image processing method according to claim 1, comprising a prior phase of training the machine learning model, wherein said prior training phase uses supervised learning based on a training dataset which comprises training images and associated reference data,
   wherein each training image represents a training scene illuminated by at most N training sources of light,
   wherein the reference data associated to a training image comprises a reference illuminant image for each training source of light illuminating the training scene, wherein each reference illuminant image comprises a reference color for the respective training source of light and a reference contribution image for the respective training source of light.

4. The image processing method according to claim 3, comprising a prior phase of generating the training dataset, wherein each training image which represents a training scene illuminated by more than one training source of light is generated by combining sub-training images, wherein each sub-training image of a training image represents the same training scene illuminated by a single respective training source of light.

5. The image processing method according to claim 4, wherein the prior training dataset generating phase comprises:
   determining a reference sub-training image for each sub-training image of a training image, wherein the reference sub-training image represents an expected corrected sub-training image in which the reference color of the single training source of light illuminating the training scene in the sub-training image has been corrected,
   determining each reference contribution image of a training image based on all reference sub-training images of said training image.

6. The image processing method according to claim 5, wherein the prior training dataset generating phase comprises:
   computing an intensity of each pixel value in each reference sub-training image,
   computing the value of each pixel of a reference contribution image by evaluating a ratio between, on one hand, the intensity of the corresponding pixel in the corresponding reference sub-training image and, on the other hand, a sum of the intensities of the corresponding pixels in all the reference sub-training images of the corresponding training image.

7. The image processing method according to claim 3, wherein the prior training phase comprises iteratively updating the machine learning model to minimize a loss function,
   wherein the loss function comprises an evaluation of a sum of distances between the estimated illuminant images generated by the machine learning model applied to the training image and their corresponding reference illuminant images.

8. The image processing method according to claim 7, wherein the reference data associated to a training image further comprises a reference training image representing an expected corrected training image,
   wherein the loss function further comprises an evaluation of a distance between an output image obtained by applying the machine learning model to the training image and its corresponding reference training image.

9. The image processing method according to claim 1, wherein the machine learning model is a convolutional neural network.

10. An image processing system for correcting colors in a target image, said image processing system comprising a correcting unit comprising at least one memory and at least one processor, wherein said at least one processor of the correcting unit is configured to:
process the input image with a machine learning model, wherein said machine learning model is previously trained to detect a predefined number N>1 of sources of light illuminating the scene and to generate N estimated illuminant images associated respectively to the N sources of light, wherein each estimated illuminant image comprises an estimated color of the light emitted by the respective source of light and an estimated contribution image comprising pixels, wherein each pixel value of said estimated contribution image corresponds to an estimated contribution of the light emitted by the respective source of light to the total illumination, by the N sources of light, of a respective portion of the scene represented by said each pixel of the estimated contribution image;
generate a total illuminant image by using the N estimated illuminant images, wherein the total illuminant image comprises pixels, wherein each pixel value of the total illuminant image corresponds to a local color determined by combining the estimated colors of the N sources of light according to the estimated contributions of the corresponding pixels in the estimated contribution images of the N estimated illuminant images; and
generate an output image by correcting the colors in the input image based on the total illuminant image.

11. The image processing system according to claim 10, wherein the N estimated contribution images generated by the machine learning model have a lower resolution than a resolution of the input image and the at least one processor of the correcting unit is further configured to up-sample the estimated contribution images before generating the total illuminant image and/or to up-sample the total illuminant image before generating the output image.

12. The image processing system according to claim 10, comprising a training unit comprising at least one memory and at least one processor, wherein the at least one processor of the training unit is configured to perform a prior training of the machine learning model by supervised learning using a training dataset comprising training images and associated reference data,
wherein each training image represents a training scene illuminated by at most N training sources of light,
wherein the reference data associated to a training image comprises a reference illuminant image for each training source of light illuminating the training scene, wherein each reference illuminant image comprises a reference color for the respective training source of light and a reference contribution image for the respective training source of light.

13. The image processing system according to claim 12, comprising a dataset generating unit comprising at least one memory and at least one processor, wherein the at least one processor of the dataset generating unit is configured to generate each training image which represents a training scene illuminated by more than one training source of light by combining sub-training images, wherein each sub-training image of a training image represents the same training scene illuminated by a respective single training source of light.

14. The image processing system according to claim 13, wherein the at least one processor of the dataset generating unit is further configured to:
determine a reference sub-training image for each sub-training image of a training image, wherein the reference sub-training image represents an expected corrected sub-training image in which the reference color of the single training source of light illuminating the training scene in the sub-training image has been corrected,
determine each reference contribution image of a training image based on all reference sub-training images of said training image.

15. The image processing system according to claim 14, wherein the at least one processor of the dataset generating unit is further configured to:
compute an intensity of each pixel value in each reference sub-training image, and
compute the value of each pixel of a reference contribution image by evaluating a ratio between, on one hand, the intensity of the corresponding pixel in the corresponding reference sub-training image and, on the other hand, a sum of the intensities of the corresponding pixels in all the reference sub-training images of the corresponding training image.

16. The image processing system according to claim 12, wherein the at least one processor of the training unit is further configured to iteratively update the machine learning model to minimize a loss function,
wherein the loss function comprises an evaluation of a sum of distances between the estimated illuminant images generated by the machine learning model applied to the training image and their corresponding reference illuminant images.

17. The image processing system according to claim 16, wherein the reference data associated to a training image further comprises a reference training image representing an expected corrected training image,
wherein the loss function further comprises an evaluation of a distance between an output image obtained by applying the machine learning model to the training image and its corresponding reference training image.

18. The image processing system according to claim 10, wherein the machine learning model is a convolutional neural network.

19. A non-transitory computer readable medium comprising computer readable code which, when executed by one or more processors, cause said one or more processors to correct colors of an input image representing a scene by:
processing the input image with a machine learning model, wherein said machine learning model is previously trained to detect a predefined number N>1 of sources of light illuminating the scene and to generate N estimated illuminant images associated respectively to the N sources of light, wherein each estimated illuminant image comprises an estimated color of the light emitted by the respective source of light and an estimated contribution image comprising pixels, wherein each pixel value of said estimated contribution image corresponds to an estimated contribution of the light emitted by the respective source of light to the total illumination, by the N sources of light, of a respective portion of the scene represented by said each pixel of the estimated contribution image;

generating a total illuminant image by using the N estimated illuminant images, wherein the total illuminant image comprises pixels, wherein each pixel value of the total illuminant image corresponds to a local color determined by combining the estimated colors of the N sources of light according to the estimated contributions of the corresponding pixels in the estimated contribution images of the N estimated illuminant images; and generating an output image by correcting the colors in the input image based on the total illuminant image.

* * * * *